United States Patent
Ye et al.

(10) Patent No.: US 8,314,900 B2
(45) Date of Patent: Nov. 20, 2012

(54) BACKLIGHT MODULE AND DISPLAY MODULE

(75) Inventors: Zhi-Ting Ye, Miaoli County (TW); Chang-Wei Yu, Nantou County (TW); Nien-Ying Yang, Taichung County (TW); Kuo-Jui Huang, Taichung County (TW); Ying-Cheng Shih, Taichung (TW)

(73) Assignee: Wintek Corporation, Taichung (TW)

( * ) Notice: Subject to any disclaimer, the term of this patent is extended or adjusted under 35 U.S.C. 154(b) by 260 days.

(21) Appl. No.: 12/938,381

(22) Filed: Nov. 3, 2010

(65) Prior Publication Data

US 2011/0102710 A1 May 5, 2011

(30) Foreign Application Priority Data

Nov. 3, 2009 (TW) ............................ 98137307 A

(51) Int. Cl.
*G02F 1/1335* (2006.01)
(52) U.S. Cl. ............................ 349/65; 349/62; 362/615
(58) Field of Classification Search ............... 349/61–69
See application file for complete search history.

(56) References Cited

U.S. PATENT DOCUMENTS

2007/0291510 A1* 12/2007 Chen .............................. 362/618
2008/0002434 A1* 1/2008 Hsieh ............................ 362/626

* cited by examiner

*Primary Examiner* — Dung T. Nguyen
(74) *Attorney, Agent, or Firm* — Jianq Chyun IP Office

(57) ABSTRACT

A backlight module that includes a light guide plate, a point light source having a light emitting surface, a first brightness enhancement film disposed above the light guide plate, and a second brightness enhancement film disposed between the light guide plate and the first brightness enhancement film is provided. The light guide plate has a rectangular pre-display area. A reference line intersects a margin of the rectangular pre-display area in 45 degrees. A normal of the light emitting surface intersects the reference line in a first included angle with ±18 degrees based on the reference line. The first brightness enhancement film has first prism structures extended in a first extending direction intersecting the normal in a second included angle with ±25 degrees based on the light emitting surface. The second brightness enhancement film is disposed between the light guide plate and the first brightness enhancement film.

18 Claims, 4 Drawing Sheets

& # x 2 0 ; # BACKLIGHT MODULE AND DISPLAY MODULE

CROSS-REFERENCE TO RELATED APPLICATION

This application claims the priority benefit of Taiwan application serial no. 98137307, filed on Nov. 3, 2009. The entirety of the above-mentioned patent application is hereby incorporated by reference herein and made a part of this specification.

BACKGROUND OF THE INVENTION

1. Field of the Invention

The invention is related to a light source module and a display module, and particularly to a backlight module and a display module using the backlight module.

2. Description of Related Art

A liquid crystal display panel takes liquid crystals as display media, and the liquid crystals are not self-illuminate material so that the liquid crystal display panel is assembled with a backlight module to construct a liquid crystal display module for achieving the displaying effect. In the market, the requirement of brightness of the liquid crystal display module becomes higher and higher, so that manufacturer usually disposes an upper brightness enhancement film and a bottom brightness enhancement film in the backlight module. Therefore, the light emitted from the liquid crystal display module can be concentrated on the normal view direction to enhance the brightness.

The upper brightness enhancement film and the bottom brightness enhancement film respectively have a plurality of prism structures regularly arranged in fixed pitch. Generally, the prism structures of the bottom brightness enhancement film are almost parallel to the light emitting direction, and the two brightness enhancement films keep a space from each other. If the light emitted from the light source enters the space and is repeatedly reflected and refracted between the prism structures of the bottom brightness enhancement film, an undesired light beam is generated. Accordingly, the disposition of the brightness enhancement film though may efficiently enhance the display brightness of the liquid crystal display module, the display effect of the liquid crystal display module may be negatively influenced.

SUMMARY OF THE INVENTION

The invention is directed to a backlight module capable of preventing the undesired light beam caused by the light repeatedly reflected and refracted between two brightness enhancement films.

The invention is directed to a display module using the backlight module and having good display quality.

The invention is directed to a backlight module that includes a light guide plate, a point light source, a first brightness enhancement film, and a second brightness enhancement film. The light guide plate has a rectangular pre-display area. The point light source has a light emitting surface, wherein a reference line intersects a margin of the rectangular pre-display area in 45 degrees, and a normal of the light emitting surface intersects the reference line in a first included angle with ±18 degrees based on the reference line. The first brightness enhancement film is disposed above the light guide plate and has a plurality of first prism structures. Each of the first prism structures is extended in a first extending direction intersecting the normal of the light emitting surface in a second included angle with ±25 degrees based on the normal of the light emitting surface. The second brightness enhancement film is disposed between the light guide plate and the first brightness enhancement film.

The invention is further directed to a display module including a display panel and a backlight module. The display panel has a plurality of scan lines, a plurality of data lines, and a plurality of pixel structures. The scan lines intersect the data lines, and the pixel structures are electrically connected to the scan lines and the data lines. The backlight module including a light guide plate, a point light source, a first brightness enhancement film, and a second brightness enhancement film is disposed under the display panel. The point light source has a light emitting surface, wherein a reference line intersects the scan lines or the data lines in 45 degrees, and a normal of the light emitting surface intersects the reference line in a first included angle with ±18 degrees based on the reference line. The first brightness enhancement film is disposed between the light guide plate and the display panel and has a plurality of first prism structures. Each of the first prism structures is extended in a first extending direction intersecting the normal of the light emitting surface in a second included angle with ±25 degrees based on the normal of the light emitting surface. The second brightness enhancement film is disposed between the light guide plate and the first brightness enhancement film.

The invention takes the design including that the normal of the light emitting surface of the point light source intersects the reference line in a first included angle between ±18 degrees from the reference line, and a second angle included between the first extending direction of the first prism structure and the normal of the light emitting surface is located between ±25 degrees from the normal of the light emitting surface. Accordingly, the light is prevented from repeatedly reflected and refracted between the first brightness enhancement film and the second brightness enhancement film, and thus the problem of an undesired light beam is eliminated. In other words, the backlight module of the invention has better illuminating evenness, and the display module using the backlight module has improved display quality.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1:
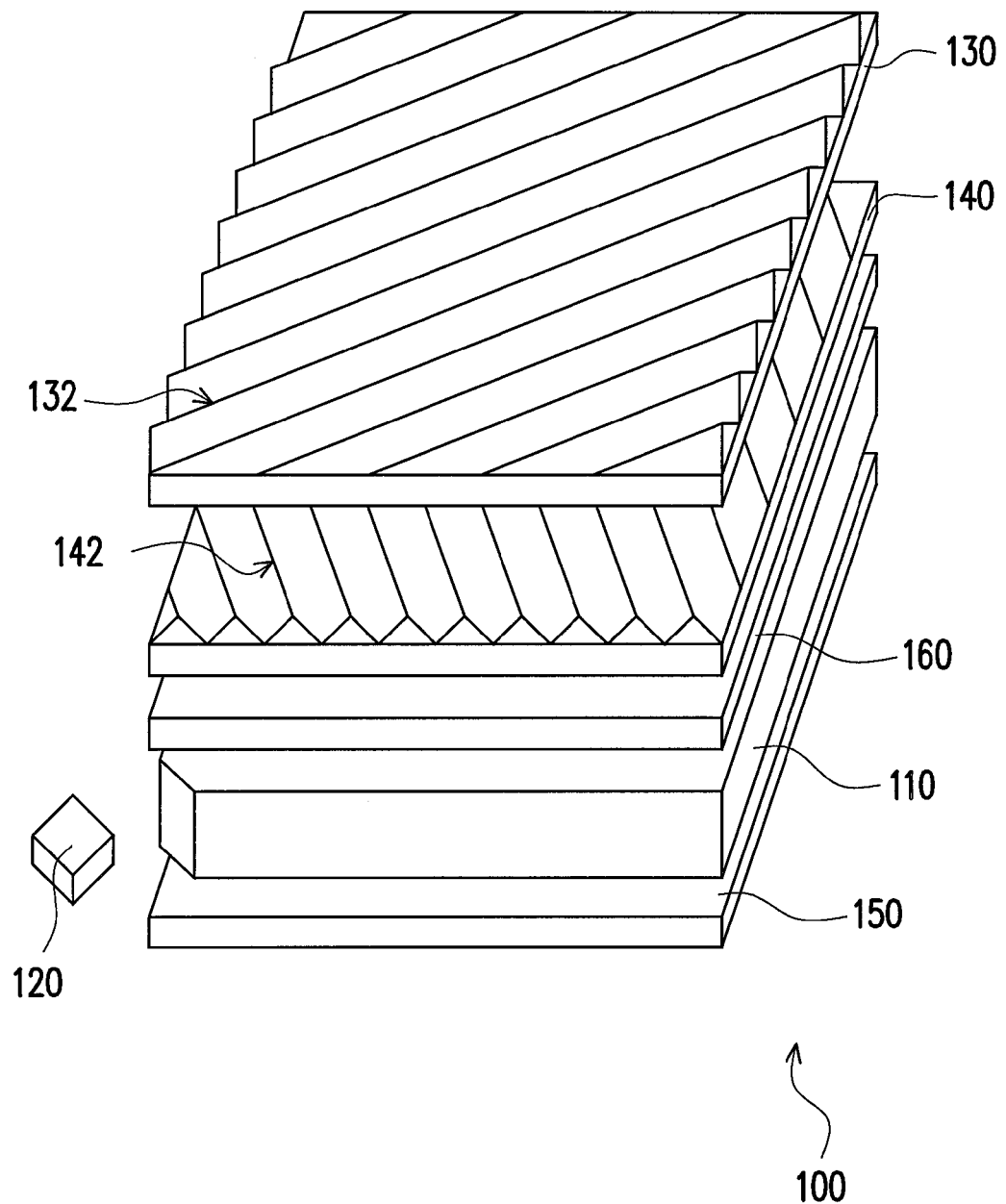
FIG. 1 is a schematic view illustrating a backlight module according to an embodiment of the invention.

FIG. 1 is a schematic view illustrating a backlight module according to an embodiment of the invention. Referring to FIG. 1, a backlight module 100 includes a light guide plate 110, a point light source 120, a first brightness enhancement film 130, and a second brightness enhancement film 140 in the present embodiment. Particularly, the backlight module 100 of the present embodiment is, for example, a side emitting type backlight module with single point light source.

In addition, for further improving the utilization rate of the light source, the backlight module 100 of the present embodiment further includes a reflector 150 and a diffuser 160. The reflector 150 disposed under the light guide plate 110 reflects the light emitting from the point light source 120 to improve the utilization efficiency of the point light source 120. The diffuser 160 is disposed between the light guide plate 110 and the second brightness enhancement film 140 for diffusing the light emitting from the point light source 120 to even the emitted light of the backlight module 100.

Figure 2:
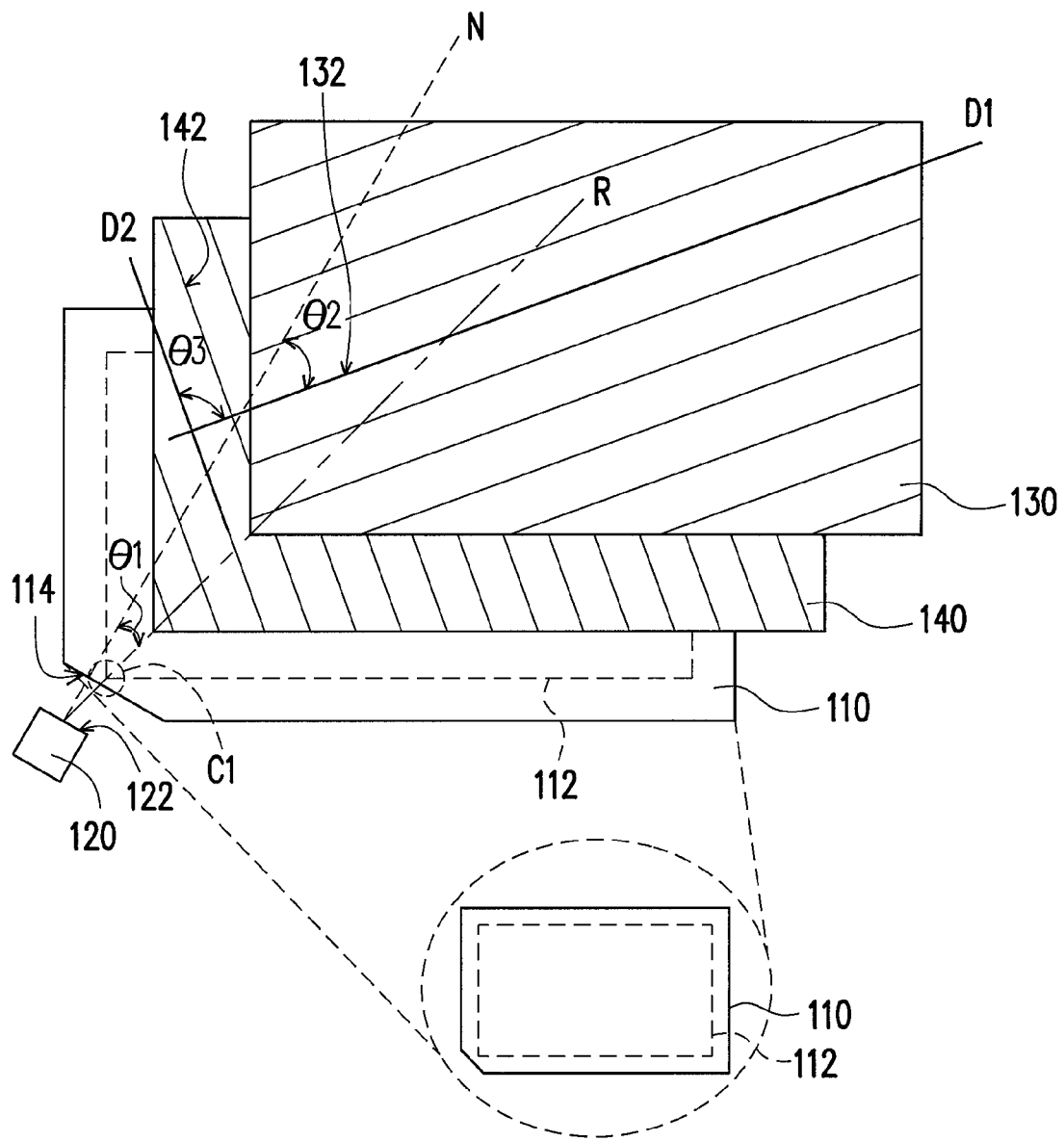
FIG. 2 is a schematic view illustrating the normal of the light emitting surface of the point light source, the extending directions of the prism structures of brightness enhancement films, and the reference line of FIG. 1 and the included angles therebetween.

FIG. 2 is a schematic view illustrating the normal of the light emitting surface of the point light source, the extending directions of the prism structures of brightness enhancement films, and the reference line of FIG. 1 and the included angles therebetween. Referring to FIG. 1 and FIG. 2 simultaneously, the light guide plate 110 has a rectangular pre-display area 112. The point light source 120 has a light emitting surface 122. Herein, a reference R is defined as a line intersects the margin of the rectangular pre-display area 112 in 45 degree, and the normal N of the light emitting surface 122 intersects the reference line R in a first included angle θ1. The first included angle θ1 is defined as ±18 degrees based on the reference line R. The first brightness enhancement film 130 is disposed above the light guide plate 110 and has a plurality of first prism structures 132. Each of the first prism structures 132 is extended in a first extending direction D1 intersecting the normal N of the light emitting surface 122 in a second included angle θ2 with ±25 degrees based on the normal N. The second brightness enhancement film 140 is disposed between the light guide plate 110 and the first brightness enhancement film 130, and has a plurality of second prism structures 142. Each of the second prism structures 142 is extended in a second extending direction D2 intersecting the first extending direction D1 in a third included angle θ3.

Specifically, the point light source 120 is a light emitting diode located corresponding to a corner C1 of the rectangular pre-display area 112 of the light guide plate 110. Furthermore, the light guide plate 110 has a light receiving surface 114 corresponding to the point light source 120 at the corner. The second included angle θ2 included between the first extending direction D1 of the first prism structures 132 and the normal N of the light emitting surface 122 is preferably smaller than or equal to 25 degrees. The third included angle θ3 included between the second extending direction D2 of the second prism structures 142 and the first extending direction D1 of the first prism structures 132 is substantially 90 degrees. Alternatively, the third included angle θ3 may be configured from 80 degrees to 90 degrees to prevent the moire phenomenon. In other words, the third included angle θ3 can be modulated in the range of 10 degrees, and can be measured clockwise or counterclockwise based on the first extending direction D1.

Generally, the first prism structures 132 and the second prism structures 142 are provided to concentrate the diverged light in the normal view angle to enhance the brightness.

In the above embodiment, the first included angle θ1 is smaller than or equal to 18 degrees and the second included angle θ2 is smaller than or equal to 25 degrees to prevent the light emitted from the point light source 120 from entering the space between the first brightness enhancement film 130 and the second brightness enhancement film 140. Thus, the bouncing effect caused by the light repeatedly reflected and refracted between the second prism structures 142 is decreased to prevent the problem of undesired light beam.

In other embodiments, a thickness of the second brightness enhancement film 140 can be larger than that of the first brightness enhancement film 130 to further obstruct the light entering the space between the first brightness enhancement film 130 and the second brightness enhancement film 140.

Figure 3:
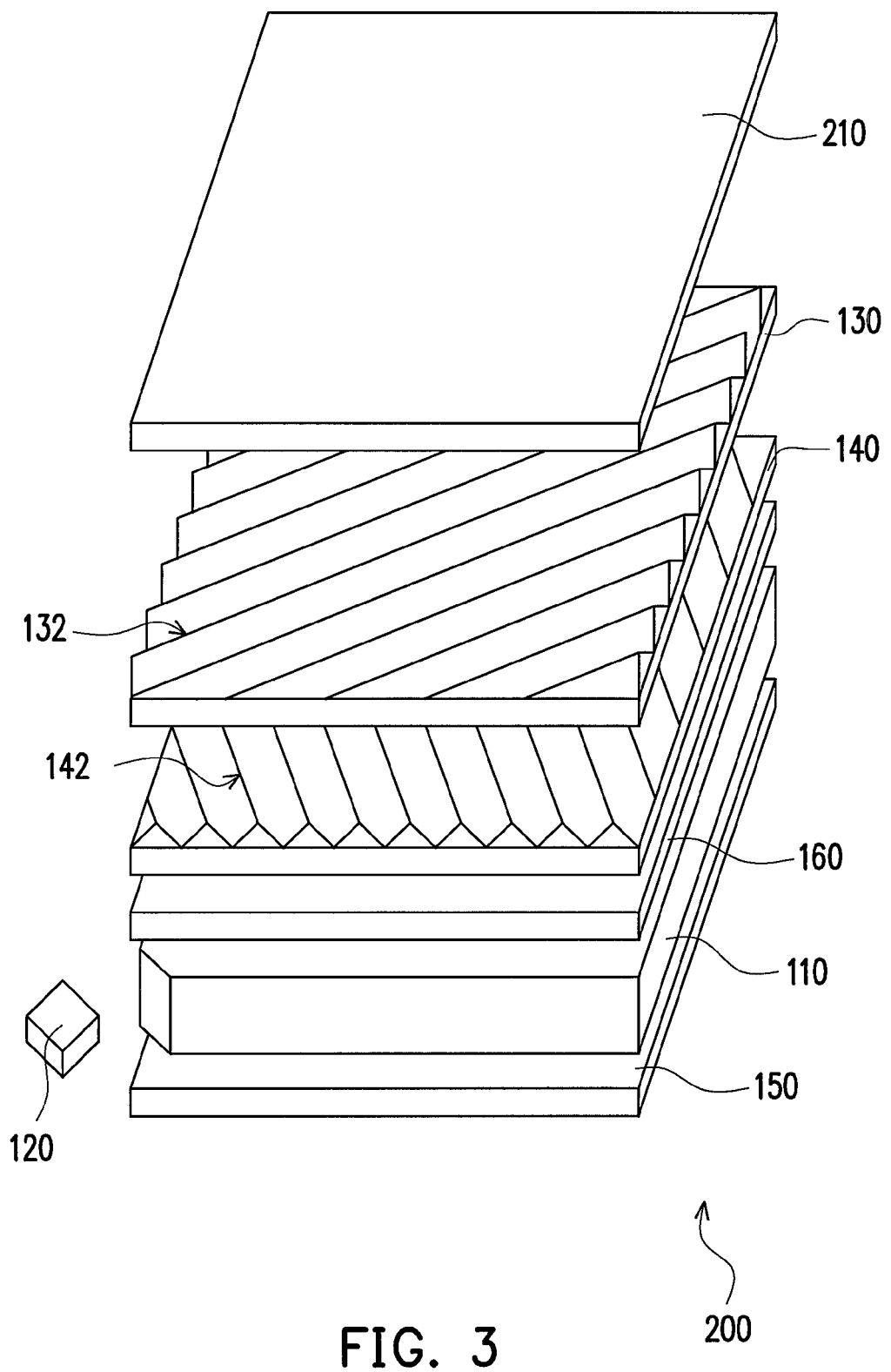
FIG. 3 is a schematic view illustrating a display module according to an embodiment of the invention.
Figure 4:
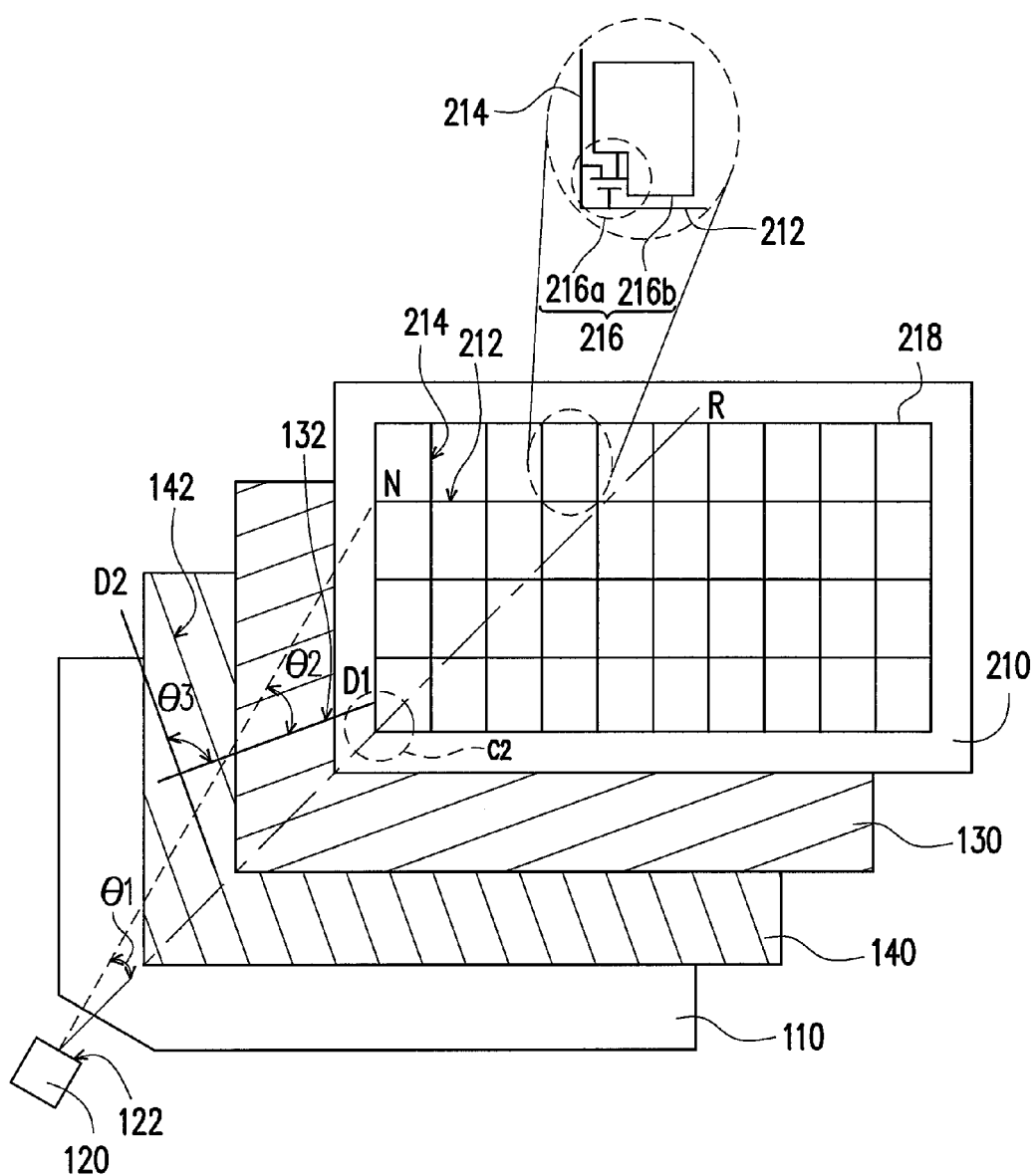
FIG. 4 is a schematic view illustrating the normal of the light emitting surface of the point light source, the extending directions of the prism structures of brightness enhancement films, and the reference line of FIG. 3 and the included angles therebetween.

FIG. 3 is a schematic view illustrating a display module according to an embodiment of the invention. FIG. 4 is a schematic view illustrating the normal of the light emitting surface of the point light source, the extending directions of the prism structures of brightness enhancement films, and the reference line of FIG. 3 and the included angles therebetween. For the convenience of the description, certain elements are omitted from FIG. 4. Referring to FIG. 3 and FIG. 4, the display module 200 includes a display panel 210 and the backlight module 100 illustrated in FIG. 1 in the present embodiment. The backlight module 100 is disposed under the display panel 210 to provide the needed surface light source. Nevertheless, the dispositions of the elements of the backlight module 100 in the present embodiment are slightly different from that in the foregoing embodiment wherein the reference line R of the present embodiment and the reference line R of the foregoing embodiment are defined in different rules.

Specifically, the display panel 210 has a plurality of scan lines 212, a plurality of data lines 214, and a plurality of pixel structures 216. The scan lines 212 intersect the data lines 214, and the pixel structures 216 are electrically connected to the scan lines 212 and the data lines 214. In addition, the pixel structure 216 includes an active device 216a and a pixel electrode 216b. In the present embodiment, the reference line R is defined as a line intersecting the scan lines 212 or the data lines 214 in 45 degrees, and the normal N of the light emitting surface 122 of the point light source 120 intersects the reference line R in a first included angle θ1 with ±18 degrees based on the reference line R.

In the present embodiment, the scan line 212, the data line 214 and the pixel structures 216 are provided to define a rectangular display area 218 corresponding to the rectangular pre-display area 112 of FIG. 1 wherein the reference line R may extend toward the same direction as the reference line R of the foregoing embodiment. Moreover, the point light source 120 can be located corresponding to a corner C2 of the display area 218 defined same as the corner C1 of the rectangular pre-display area 112 of the light guide plate 110. Specifically, the shape of the display area 218 may be changed with different designs, and not limited in rectangle.

In the above embodiments of the present invention, the reference line intersects with the rectangular pre-display area of the light guide, or with the data lines or scan lines of the display panel in 45 degrees. In addition, the normal of the light emitting surface of the point light source intersects the reference line in an included angle smaller than or equal to 18 degrees. Furthermore, the first extending direction of the first prism structures of the first brightness enhancement film intersects the normal of the light emitting surface of the point light source in an included angle smaller than or equal to 25 degrees. Thus, the light repeatedly reflected and refracted between the second prism structures is decreased to prevent the problem of undesired light beam. Therefore, the point light source, the first brightness enhancement film, and the second brightness enhancement film are arranged to provide better illuminating evenness and improved display quality. In addition, the thickness of the second brightness enhancement film is larger than that of the first brightness enhancement film to improve the illuminating evenness of the back light module.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A backlight module, comprising:
a light guide plate having a rectangular pre-display area;
a point light source having a light emitting surface, wherein a reference line intersects a margin of the rectangular pre-display area in 45 degrees, and a normal of the light emitting surface intersects the reference line in a first included angle with ±18 degrees based on the reference line;
a first brightness enhancement film disposed above the light guide plate, and having a plurality of first prism structures, wherein each of the first prism structures is extended in a first extending direction intersecting the normal of the light emitting surface in a second included angle with ±25 degrees based on the normal of the light emitting surface; and
a second brightness enhancement film disposed between the light guide plate and the first brightness enhancement film.

2. The backlight module of claim 1, wherein the point light source corresponds to a corner of the rectangular pre-display area of the light guide plate.

3. The backlight module of claim 1, wherein the point light source is a light-emitting diode.

4. The backlight module of claim 1, further comprising a reflector disposed under the light guide plate.

5. The backlight module of claim 1, further comprising a diffuser disposed between the light guide plate and the second brightness enhancement film.

6. The backlight module of claim 1, wherein the second brightness enhancement film has a plurality of second prism structures, wherein each of the second prism structures is extended in a second extending direction intersecting the first extending direction in a third included angle.

7. The backlight module of claim 6, wherein the third included angle is substantially 90 degrees.

8. The backlight module of claim 6, wherein the third included angle is from 80 degrees to 90 degrees.

9. The backlight module of claim 1, wherein the second brightness enhancement film has a thickness larger than that of the first brightness enhancement film.

10. A display module, comprising:
a display panel having a plurality of scan lines, a plurality of data lines, and a plurality of pixel structures, wherein the scan lines intersect the data lines, and the pixel structures are electrically connected with the scan lines and the data lines; and
a backlight module disposed under the display panel, and comprising:
a light guide plate;
a point light source having a light emitting surface, wherein a reference line intersects the scan lines or the data lines in 45 degrees, and a normal of the light emitting surface intersects the reference line in a first included angle with ±18 degrees based on the reference line;
a first brightness enhancement film disposed between the light guide plate and the display panel, and having a plurality of first prism structures, wherein each of the first prism structures is extended in a first extending direction intersecting the normal of the light emitting surface in a second included angle with ±25 degrees based on the normal of the light emitting surface; and
a second bright enhancement film disposed between the light guide plate and the first brightness enhancement film.

11. The display module of claim 10, wherein when a display area defined by the scan lines, the data lines, and the pixel structures is rectangular, the point light source corresponds to a corner of the display area.

12. The display module of claim 10, wherein the point light source is a light-emitting diode.

13. The display module of claim 10, wherein the backlight module further comprises a reflector disposed under the light guide plate.

14. The display module of claim 10, wherein the backlight module further comprises a diffuser disposed between the light guide plate and the second brightness enhancement film.

15. The display module of claim 10, wherein the second brightness enhancement film has a plurality of second prism structures, wherein each of the second prism structures is extended in a second extending direction intersecting the first extending direction in a third included angle.

16. The display module of claim 15, wherein the third included angle is substantially 90 degrees.

17. The display module of claim 15, wherein the third included angle is from 80 degrees to 90 degrees.

18. The display module of claim 10, wherein the second brightness enhancement film has a thickness larger than that of the first brightness enhancement film.

* * * * *